May 23, 1939. F. R. IBAÑEZ 2,159,896
ARTICULATED MECHANISM FOR THE TRANSMISSION OF MOVEMENT
Filed Dec. 9, 1937
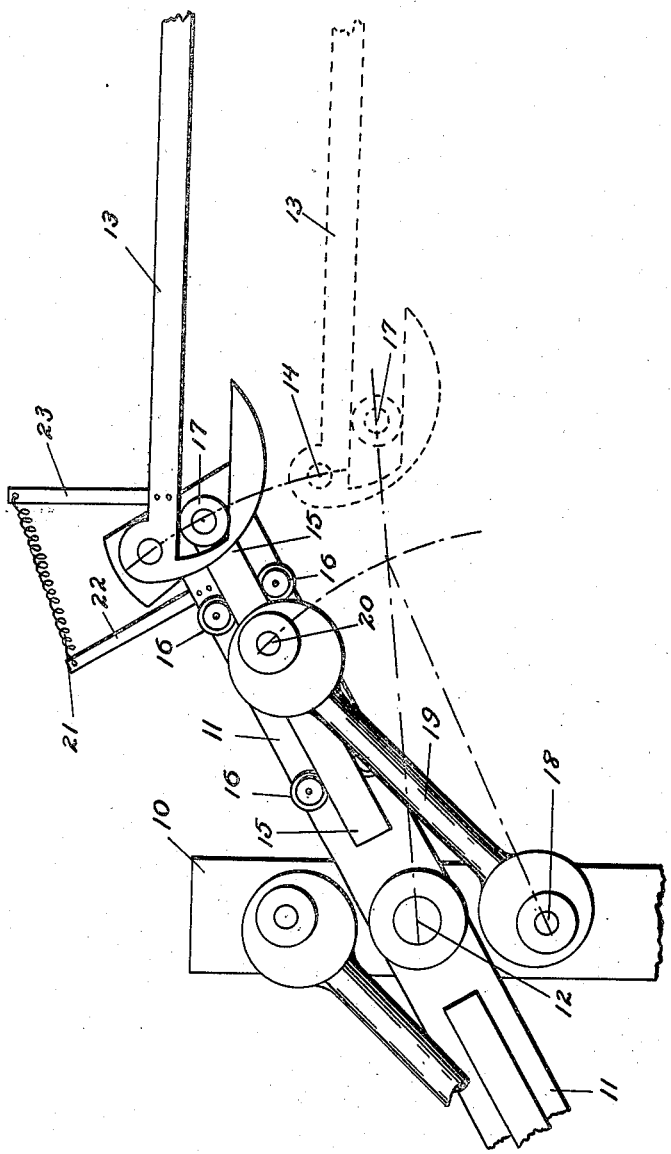
Inventor
Francisco Roig Ibanez
Attorney Patented May 23, 1939

2,159,896

UNITED STATES PATENT OFFICE 2,159,896

ARTICULATED MECHANISM FOR THE TRANSMISSION OF MOVEMENT

Francisco Roig Ibañez, Mexico, D. F., Mexico

Application December 9, 1937, Serial No. 178,989
In Mexico October 30, 1937

3 Claims. (Cl. 74—25)

The present invention refers to mechanical movements in general, and more particularly to an articulated mechanism for the transmission of movements, which transforms substantially a perceptibly oscillating movement into a displacement along perfect horizontal planes.

The composite mechanical movement according to the present mechanism, is essentially obtained by means of a lever having a variable form and section, which will revolve with or on an adequate axis, and form the first section of same; the second section is constituted by a lever articulated with the former one which will also be supported freely on an axis or fulcrum arranged on the first lever, and a slide that can be slipped along with facility on the first lever, as will be made apparent with all clarity in the following description. With a determined eccentricity in connection with the axis of the said first lever, another axis or fulcrum is arranged with which, or over which will revolve the end of a connecting rod, and with its opposite end revolving on an axis provided on the slide or runner piece to which mention has been made before; in such a manner that the said runner piece, due to the trajectory which the said connecting rod obliges it to follow, may determine the displacement of the second section of the lever along the horizontal planes.

In view of the foregoing, the principal object of the invention consists in providing a perfected mechanism for obtaining the transformation of a radial movement into a movement or displacement along horizontal planes, for its application to an infinite number of industrial uses and purposes.

The characteristic details of the present mechanism shall be made apparent with all clarity in the following description, as well as in the drawing accompanying it as an illustration, in which drawing the reference signs indicate the different parts that compose the said mechanism.

In the drawing:

The only figure shown presents a partial elevation of the present mechanism or mechanical movement, in accordance with the invention, wherein there can be clearly seen the different parts which compose it, and another position of its movement by means of broken lines.

I believe it convenient to mention that the drawing illustrates as an example only, a form for carrying out the purposes of the invention, but that this is not in any way limited to the secondary specific details as are illustrated and described; variations and modifications can be effected without departing from the principles and scope of the invention, and naturally within the purview of the clauses of the chapter of claims.

With specific reference to the attached drawing, the mechanism comprises a central supporting piece or post 10, in which the lever 11 rests, of a variable form and section, whose lever or section 11 will revolve with or on an adequate axis 12 arranged on the mentioned post 10; the mentioned lever 11 constitutes the first section of the mechanism. The second section is constituted by the lever of special form 13, which revolves or is supported freely on an axis or fulcrum 14 arranged on the end of the first section or lever 11.

Referring again to the lever 11, the latter has a slide 15 provided, of like variable form and section, which can slip with facility along over the length of same and whose trajectory over the said lever is determined by the stop plates or guides 16. At the end of the mentioned slide 15, the axis 17 is located, which supports the second section of the lever 13, with respect to its rotation on the axis 14, as arranged on the lever 11. With a determined eccentricity with respect to the axis or fulcrum 12, of the first section of the lever, another axis or fulcrum 18 is located, with which or over which there revolves the anterior end of a connecting rod 19, whose opposite end revolves on the axis 20, mounted at a pre-calculated distance precisely on the slide or runner piece 15, or the first section or lever 11. The said slide or runner piece 15, due to the trajectory which the said connecting rod 19 obliges it to follow, upon the movement of the lever 11, on its axis 12, may determine the displacement of second section or lever 13, along perfectly horizontal planes, due to the action of the axis or fulcrum 17 with respect to 14.

For the purpose of diminishing the presure at the point of contact 17, of the slide 15 with the second section of lever 13, both sections may be united with a spring or elastic piece 21, by means of the small iron plate 22 fastened to the lever 11, and 23 fastened to 13; in this manner the spring or elastic piece 21, will tend to maintain the same direction—towards the two sections before mentioned, diminishing the presure, and consequently, the losses on account of friction, at the place of contact 17.

The mechanism may be composed of one or several devices as the one described.

Having thus described the invention, what I consider as new and desire to secure by Letters Patent is:

1. An articulated mechanism for the transformation of oscillating movements into movements displaceable along horizontal planes, comprising a first lever section mounted for oscillation, a second lever section articulated with the first lever section, a slide movable longitudinally of the first lever section, an element carried by the slide having movable connection with the second lever section, and a connecting rod mounted with a predetermined eccentricity to the axis of the first lever section and connected with a predetermined eccentricity to the slide, whereby the slide movable under the operation of the connecting rod will cause the element carried by the slide to maintain the displacement of the second lever section in horizontal planes during oscillation of the first lever section.

2. A construction as defined in claim 1, wherein guides secured on the first lever section determine the trajectory of the slide under the movement of the connecting rod.

3. A construction as defined in claim 1, wherein a spring connects the first and second lever sections to reduce friction losses between the slide-carried element and the second lever section.

FRANCISCO ROIG IBAÑEZ.